Figure 1:
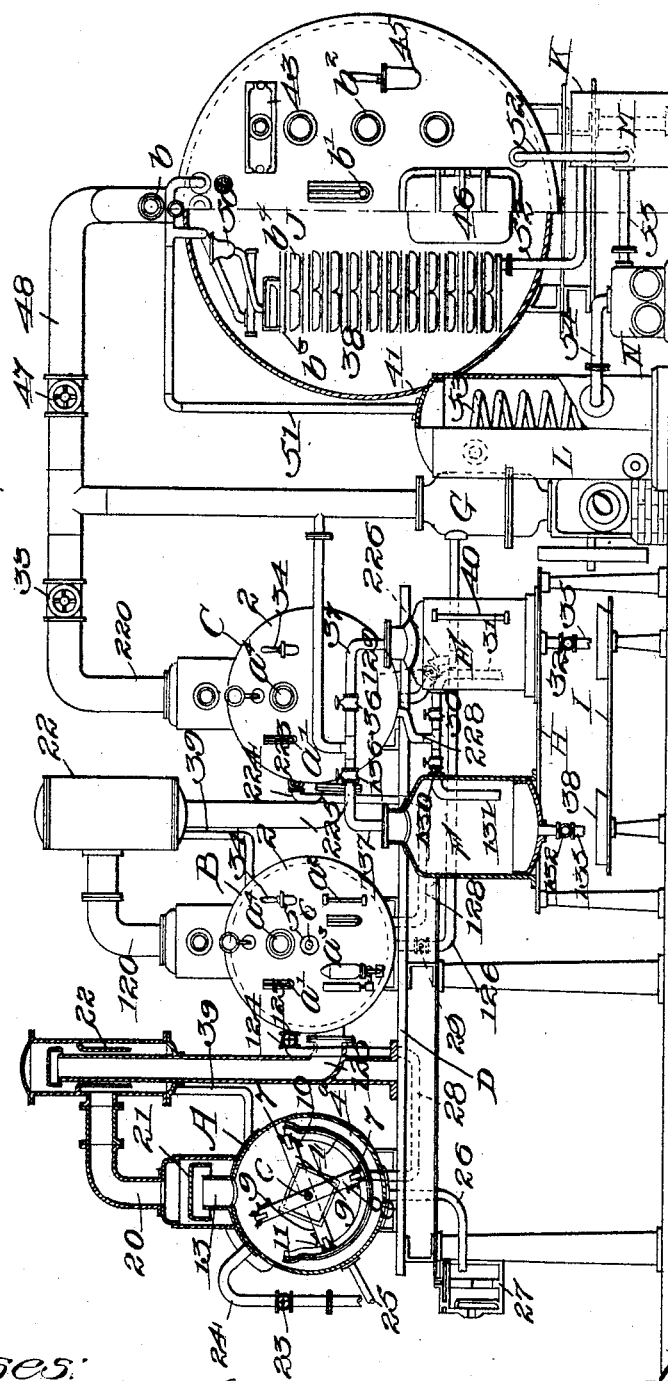

No. 785,776. PATENTED MAR. 28, 1905.
T. SUZUKI.
APPARATUS FOR MAKING SOY EXTRACTS.
APPLICATION FILED JULY 28, 1904.

3 SHEETS—SHEET 1.

Witnesses:
O. M. Wennick
C. H. Crawford

Inventor:
Tozaburo Suzuki
by B. Singer
Attorney.

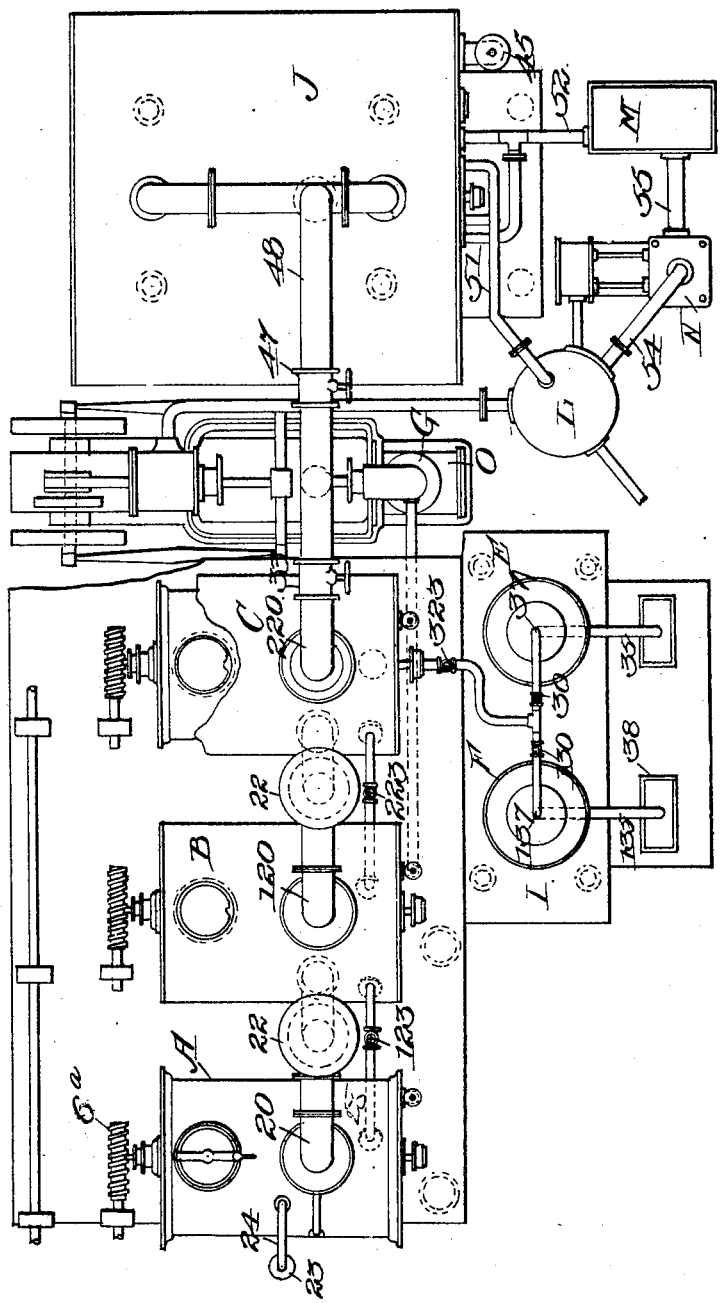

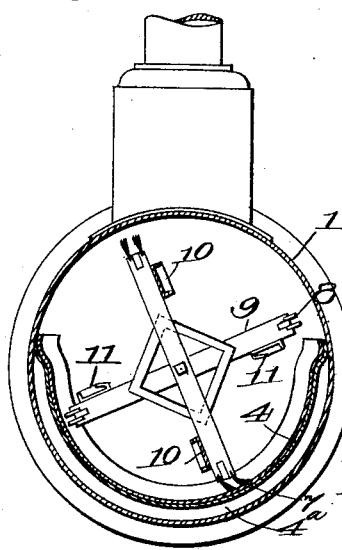
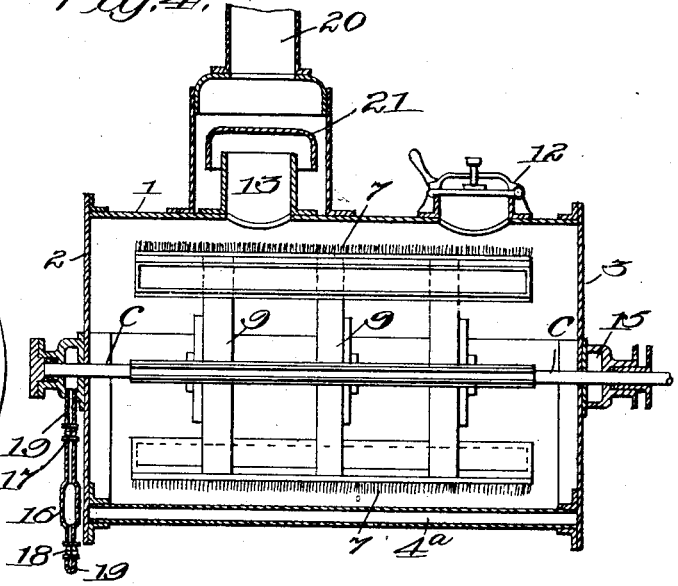
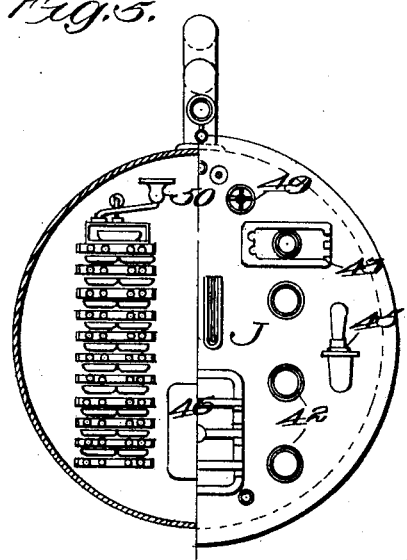
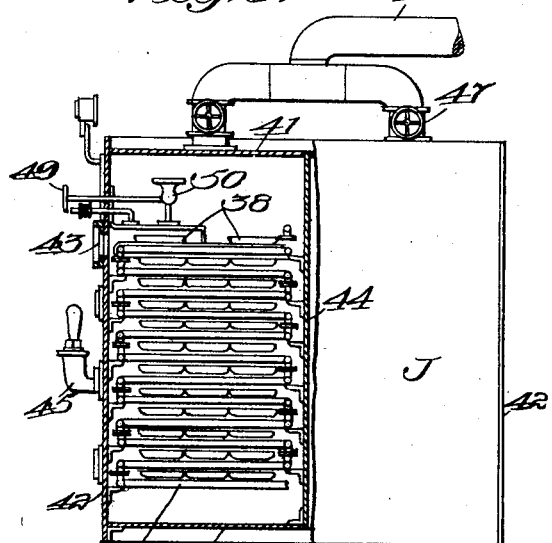
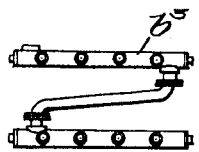

No. 785,776.

Patented March 28, 1905.

UNITED STATES PATENT OFFICE.

TOZABURO SUZUKI, OF SUNAMURA, JAPAN.

APPARATUS FOR MAKING SOY EXTRACTS.

SPECIFICATION forming part of Letters Patent No. 785,776, dated March 28, 1905.

Application filed July 28, 1904. Serial No. 218,486.

*To all whom it may concern:*

Be it known that I, TOZABURO SUZUKI, a subject of the Emperor of Japan, residing at No. 401 Jibeishinden, Sunamura, county of Minumi Katsushika, Japan, have invented certain new and useful Improvements in Apparatus for Manufacturing Soy Extracts and Condensing other Juices, of which the following is a specification.

This invention relates to apparatus adapted to be used for evaporating and condensing soy or other juices. Its objects are to condense the juices at a low temperature in such a manner that there will be rapid evaporation without changing the original quality of the juices.

A further object in the treatment of soy is to remove the odors of yeast and in the treatment of other juices to accomplish the condensation regularly and completely without the use of pumps, &c.

It consists in the combination of means for regularly stirring up and evaporating soy or other juices in a number of vacuum evaporating-pans of special construction and means for further evaporating and condensing the juices in flat vessels placed in vacuum finishing-receptacles of special construction.

In the accompanying drawings, illustrating this invention, Figure 1 is a front view of an apparatus embodying the same, parts being broken away to show interior construction. Fig. 2 is a plan view of the apparatus shown in Fig. 1. Fig. 3 is a cross-sectional view of one of the vacuum evaporating-pans. Fig. 4 is a longitudinal sectional view of the same. Fig. 5 is an end view, partly in section, of the vacuum finishing-receptacle. Fig. 6 is a side elevation, partly in section, of the same; and Fig. 7 is a detail showing the method of connecting the heating-pipes in the vacuum finishing-receptacle.

The vacuum evaporating-pans A B C are all of the same construction and consist of hermetically-closed cylinders comprising body portions 1, front heads 2, and rear heads 3, as shown particularly in Figs. 3 and 4. The front head 2 is provided with a pressure-gage $a$, thermometer $a'$, water-gage $a^2$, consistency-testing apparatus $a^3$, and observation-window $a^4$ and air-conducting-valve 34. The pan is also provided with an interior wall 4 to provide a chamber $4^a$ in the bottom, in which steam or vapor may be admitted. The pans are provided at either end with centrally-mounted bearings 5, which support a shaft 6, passing through the pan. These shafts are driven in any desired manner, as by means of the gears $6^a$. Frames 9 are mounted on the shafts 6 within the pans. These frames carry brushes 7 and stirring-plates 8 and are also provided with buckets 10 for carrying up the juice and pouring it back toward the center and other buckets, 11, for pouring down the ladled juice on the right side of the base D. Manholes 12 and discharge-holes 13 are provided at the top of the pans. The discharge is provided with a hood 21, preventing the discharge of the juice. The discharge is continued through a discharge-pipe 20, provided with an enlarged base fitting over the hood 21 and connected to the top of the body or the drum. The bearings 5 are provided with interior oil-chambers 15, which are connected, by means of a pipe 19, with an oil-tank 16, a valve 17 being provided in the pipe 19 and a valve 18 in the pipe leading from said oil-tank. The air-discharge pipe 20 from the first pan A and 120 from the second pan B are provided with second juice-separating devices 22, which deflect the direction of the vapor and separate the juice, which returns to the original pans through pipes 39. The evaporating-pan A is provided with a juice-inlet pipe 24 for the continual supply of juice, which may be regulated by means of the cock 23. The bottom chamber of this pan is provided with a steam-inlet pipe 25 from any convenient source of steam. The condensed water is discharged from a tube 26 into a steam-trap 27. The juice-discharge pipe 28 from the lower part of the pan A is connected with the juice-supply pipe 124 of the pan B and is provided with a cock 123. The juice-discharge pipe 128 from the lower part of the evaporating-pan B is connected with the juice-conducting pipe 224 of the pan C and is provided with a cock 223. The juice-discharge pipe 228 of the pan C is provided with a cock 323 and is connected with juice-feeder pipes 31 and 131 of juice-reservoirs E and F, and these pipes are provided with cocks 30 and 130. The air-exhaust pipe 20 from the pan A is connected, by means of the separator 22, with the pipe 125, which leads to the pan B. The pipe 120 from the pan B is connected, by means of a similar separator 22, with the pipe 225, which leads to the pan C. The air-exhaust pipe 220 of the pan C is connected with a steam-condenser and an air-pump and is provided with a regulating-valve 33. The air-discharge pipes 126 and 226 are connected with the air-pump G and are provided with cocks 29 and 129.

Two frames H and I, somewhat lower than the frame D, are placed in front of the latter and support hermetically-closed juice-reservoirs E and F, which are provided at the upper parts with juice-inlet pipes 31 and 131, having cocks 30 and 130. These reservoirs are also provided with water-gages 40 and have discharge-pipes 35 and 135 leading from the bottoms thereof to discharge the juices in the vessels 38, placed on the frame I. The pipes 35 and 135 are provided with cocks 32 and 132. The reservoirs are provided at the top with air-suction pipes 37 and 137, having cocks 36 and 136, which connect reservoirs with the air-pump G.

The vacuum finishing-receptacle J consists of a hermetically-closed drum, comprising the body 41, with heads 42, and is divided into front and back compartments by a divisional wall 44. This receptacle is mounted on a suitable frame K. The receptacle is provided with a pressure-gage $b$, a thermometer $b'$, observation-window $b^2$, air-conducting valve 45, testing device 43, and manhole 46. The upper parts of the two chambers of the receptacle are connected with the air-suction pipe 48, which is provided with regulating-valves 47. This pipe leads to the air-pump G. In each end of the receptacle are rows of shelves, formed of heat-transmitting pipes $b^3$. These pipes are made to communicate with each other throughout the whole system of shelves, and iron plates are placed on the pipes to receive the vessels $b^4$, containing the juices.

The testing device 43 is a separate chamber. It may be placed in communication with the interior of the receptacle J by means of the valve 50, which is controlled by a handle 49, extending out through the wall of said receptacle. A vessel 38, placed in this chamber, may be removed through the outer door without disturbing the operation within the receptacle.

The upper end of the heat-transmitting pipe from the vacuum finishing-receptacle J is connected with the upper part of the water-heater L by means of the pipe 51, while the lower end is connected with the water-tank M by means of the water-discharge pipe 52. The water-heater L consists of a suitable drum having an interior spiral tube 53. The drum is connected at the top with the pipe 51, as aforesaid, and at the bottom with a delivery-pipe 54, leading to a pump N, the water-suction tube 55 of said pump being connected with the water-tank M. The lower end of the spiral tube 53 is connected with the steam-discharge pipe of the engine O, which operates the pump G, the upper end of said spiral being open to the atmosphere.

In order to manufacture soy extract or to condense other juices by means of this apparatus, the cock 23 is opened and a suitable quantity of juice is admitted to the vacuum evaporating-pan A through the pipe 24, and steam is admitted from the steam-pipe 25 into the base-chamber $4^a$. The cocks 123 223 29 129 32 36 and the regulating-valves 33 are opened and the air-pump G started. The air-pump is connected by suitable means with the gearing for driving the shafts 6, so that the latter are all driven simultaneously. The steam admitted under the base 4 heats the juices in the pan, and the water produced by condensation is discharged through the steam-trap 27. In this manner the juice becomes heated and completely evaporated by being brought in contact with the left side of the base 4 by means of the brush 7 and stirring-plate 8 and as a result of being sprinkled downward by bucket 10 and by being poured upon the entire surface of the right side of the base 4 by the bucket 11. The interior of pan B being of lower pressure than that of the pan A, the juice, which is more or less condensed in the latter, will make its way into the pan B through the discharge-pipe 28 and through the conducting-pipe 124. The vapor in the pan A is more or less mixed with juice, which will be separated by the separator 22, and the vapor will enter under the base 4 of the pan B from the upper conducting-pipe 125 and heat this pan. Thus the operation of evaporation is repeated in the pan B just as in the pan A. A similar operation takes place between the pan B and the pan C, and the juice that has become gradually concentrated by passing through the steam-pans A, B, and C will enter the juice-receptacle E from the juice-discharge pipe 228 from the conducting-pipe 31. When the gage 40 indicates that the juice has almost filled the receptacle E, the cocks 30 and 36 are closed, and the juice is then conducted into the receptacle F by opening the cocks 130 and 136, while the juice in the pan C is conducted through the discharge-pipe 35 into the vessel 38, placed on the frame I. These vessels will then be placed in rows on the shelves in the vacuum finishing-receptacle J. The receptacle is then closed and the valves 47 opened, so that the interior of the pan is exhausted by means of the air-pump. The pump N forces the water from the tank M through the delivery-pipe 54 to the water-heater L, where it becomes heated, and then passes through the pipe 51 to the heat-transmitting pipes that form the shelves in the receptacle J. After passing through these pipes the water returns to the tank M through the discharge-tube 52. The heat within the receptacle J will be transmitted to the vessels 38 and cause a moderate evaporation of the juices contained therein. When the degree of concentration is judged sufficient by examining it by means of the testing device, the regulating-valve 47 is closed, and air is admitted into the receptacle J through the valve 45, and the vessels 38 are then taken out through the manhole 46. When a suitable quantity of juice is collected in the juice-receptacle F, the evaporation, as above described, will be performed in the opposite end of the receptacle J. The arrangement is such that the two chambers in the vacuum finishing-chamber J may be used alternately. In general the albuminous substance of soy is immediately separated and coagulated after it is somewhat condensed and it has been subjected to a heat of over 40° centigrade, so that no complete extract retaining the original quality of soy has hitherto been in vogue.

By means of the present invention a juice containing even a large percentage of water can be quickly evaporated by subjecting it to the high temperature in the vacuum steam-pan A, and as evaporation can be gradually effected by lowering the temperature and pressure no change is caused in the ingredients or in the essential quality of the original juice by the concentration. Therefore this invention is perfectly adapted for manufacturing extracts of soy or condensing other juices. Moreover, the action of evaporation is facilitated by constantly ladling the juice and sprinkling it downward in the vacuum operating-pan and by discharging it on all of the heated portion. Any excessive heating and incrustation of the juice in the bottom is prevented, as the heated parts are constantly being swept by the brush. This apparatus is especially effectual for removing the odor of yeast of the soy. The utilization of heat in the pans B and C is obtained by utilizing the vapor from the pans A and B, while the heat in the vacuum finishing-receptacle J comes from the waste steam of the pump. The operation is also simple, and no trouble is required except in supplying and discharging the juice in the vacuum finishing-pan. By dividing the latter into front and back compartments and by providing the juice-receptacles E and F, capable of being used alternately, constant and continual operation can be performed. Consequently I have provided a novel and useful apparatus.

Having thus described my invention, what I claim, and desire to secure by Letters Patent, is—

1. An apparatus for manufacturing soy extract and condensing other juices, comprising a primary evaporating-pan, means for heating said pan by steam, means for stirring the juices in said pan, a second evaporating-pan of lower pressure than the first pan, means for utilizing vapor from the first pan as the source of heat from the second pan, means for stirring the juices in the second pan, a third vacuum evaporating-pan of lower pressure than the second pan, and means for heating the third pan by using the vapor from the second pan as the source of heat, and a vacuum finishing-receptacle adapted to be heated by warm water, and means within said receptacle for receiving vessels filled with the juice to be evaporated, and means for evacuating said finishing-receptacle.

2. An apparatus of the character set forth, comprising a plurality of vacuum evaporating-pans, vacuum juice-receptacles adapted to receive the juice from the last of said pans, a vacuum finishing-receptacle, an air-pump connected with said finishing-receptacle, and said pans for exhausting the same, and means for heating said vacuum-pans and said vacuum finishing-receptacle.

3. An evaporating device, comprising a cylindrical drum provided with a double bottom, means for introducing steam into the chamber formed by said double bottom, means for introducing the liquid to be evaporated into the main portion of said cylinder, a rotary stirring device in said cylinder, a brush on said device, said cylinder having an air-exhaust outlet and a hood over said outlet to prevent the discharge of the fluid.

4. The combination of a plurality of vacuum evaporating-pans, means for heating the first of said pans, means for introducing the fluid to be condensed into the first of said pans, an air-exhaust pipe from the first of said pans leading to the heating-chamber of the second pan, a fluid-separator in said exhaust-pipe, a pipe for conducting the partially-evaporated fluid from the first pan to the evaporating-chamber of the second pan, similar connections between the second pan and the third pan, means for exhausting the air from said third pan, receptacles for receiving the condensed fluid and means for alternately discharging the fluid into said receptacles.

5. A vacuum evaporating finishing-receptacle comprising a closed cylinder divided into two sections, shelves in said sections formed of connected pipes adapted to be heated from a source of heat-supply, fluid-containing vessels adapted to be inserted on said shelves and means for exhausting the air from either of said chambers.

In testimony whereof I affix my signature in presence of two witnesses.

TOZABURO SUZUKI.

Witnesses:
R. S. MILLER,
U. ISHIWARAS.